United States Patent
Andersson et al.

(10) Patent No.: US 7,916,681 B2
(45) Date of Patent: Mar. 29, 2011

(54) METHOD AND APPARATUS FOR COMMUNICATION CHANNEL ERROR RATE ESTIMATION

(75) Inventors: Lennart Andersson, Hjärnarp (SE); Yi-Pin Eric Wang, Cary, NC (US); Gregory E Bottomley, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1441 days.

(21) Appl. No.: 11/296,560

(22) Filed: Dec. 7, 2005

(65) Prior Publication Data
US 2006/0262754 A1 Nov. 23, 2006

Related U.S. Application Data

(60) Provisional application No. 60/683,203, filed on May 20, 2005.

(51) Int. Cl.
*H04B 7/185* (2006.01)

(52) U.S. Cl. .......... 370/318; 370/332; 370/278; 455/69; 455/126

(58) Field of Classification Search .................. 455/424, 455/425, 456.5, 456.6, 561, 550.1, 575.1, 455/423, 13.4, 522, 63.1, 67.11, 69, 92, 127.2, 455/162, 115.4, 24, 126; 370/342, 311, 278, 370/282, 333, 292, 332, 318, 252, 328, 241, 370/465; 375/148, 211, 231, 346, 358
See application file for complete search history.

(56) References Cited

U.S. PATENT DOCUMENTS

| | | | |
|---|---|---|---|
| 6,085,106 A * | 7/2000 | Sendonaris et al. | 455/522 |
| 6,760,320 B1 * | 7/2004 | Bune | 370/342 |
| 6,760,598 B1 * | 7/2004 | Kurjenniemi | 455/522 |
| 6,876,867 B2 * | 4/2005 | Tiedemann et al. | 455/522 |
| 7,116,978 B2 * | 10/2006 | Baker et al. | 455/423 |
| 7,170,866 B2 * | 1/2007 | Lee et al. | 370/311 |
| 7,184,791 B2 * | 2/2007 | Nilsson et al. | 455/522 |
| 7,236,515 B1 | 6/2007 | Pope | |
| 7,336,751 B2 * | 2/2008 | Harada et al. | 375/365 |
| 7,522,561 B2 * | 4/2009 | Yano et al. | 370/333 |
| 2001/0030955 A1 * | 10/2001 | Lee et al. | 370/342 |

(Continued)

OTHER PUBLICATIONS

Third Generation Partnership Project Working Group # 4., "Physical Channels and Mapping of Transport Channels Onto Physical Channels (FDD)." Technical Specification Group Radio Access Network TS 25.211, Mar. 2005, 50 pages, Version 6.7.0.

(Continued)

*Primary Examiner* — Duc Nguyen
*Assistant Examiner* — Charles Chow
(74) *Attorney, Agent, or Firm* — Coats & Bennett, P.L.L.C.

(57) ABSTRACT

A wireless communication device or system generates transmit power control feedback for a received power control channel by determining a command error rate (CER), or by identifying a target signal quality for the power control channel according to a defined signal-quality-to-CER mapping function. Generally, the power control channel does not include error-coded data to use for CER estimation. However, in one embodiment, the channel does include known reference bits that are evaluated for CER estimation, with the estimated CER used to set the signal quality target for inner loop power control. In other embodiments, a computed reception error probability is used to identify a CER estimate according to a defined probability-to-CER mapping function. By way of non-limiting example, these embodiments may be used to provide power control feedback for power control commands transmitted on a Fractional Dedicated Physical Channel in WCDMA systems.

34 Claims, 9 Drawing Sheets

U.S. PATENT DOCUMENTS

| | | | |
|---|---|---|---|
| 2002/0115462 A1* | 8/2002 | Hottinen | 455/522 |
| 2003/0076799 A1 | 4/2003 | Kwak et al. | |
| 2003/0092447 A1 | 5/2003 | Bottomley et al. | |
| 2004/0005906 A1* | 1/2004 | Okumura et al. | 455/522 |
| 2004/0209636 A1* | 10/2004 | Chen et al. | 455/522 |
| 2004/0213332 A1 | 10/2004 | Doetsch et al. | |
| 2005/0036538 A1* | 2/2005 | Niederholz et al. | 375/148 |
| 2005/0043051 A1* | 2/2005 | Takano et al. | 455/522 |
| 2006/0007989 A1* | 1/2006 | Chen et al. | 375/146 |
| 2006/0246937 A1* | 11/2006 | Lindoff | 455/522 |
| 2006/0262840 A1* | 11/2006 | Wang et al. | 375/221 |
| 2007/0218935 A1* | 9/2007 | Chi et al. | 455/522 |

OTHER PUBLICATIONS

Third Generation Partnership Project Working Group #4., "Physical Layer Procedures(FDD)." Technical Specification Group Radio Access Network TS 25.214, Jun. 2005, 60 pages, V6.7.1.

* cited by examiner

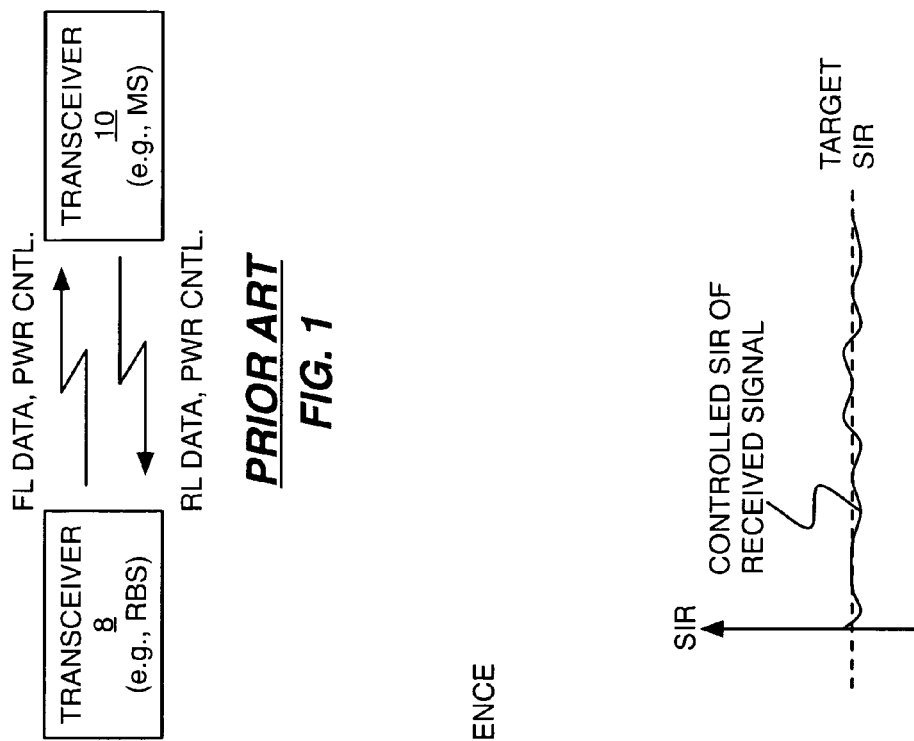
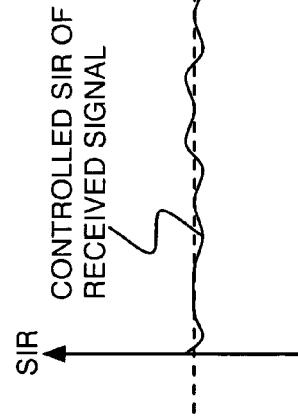
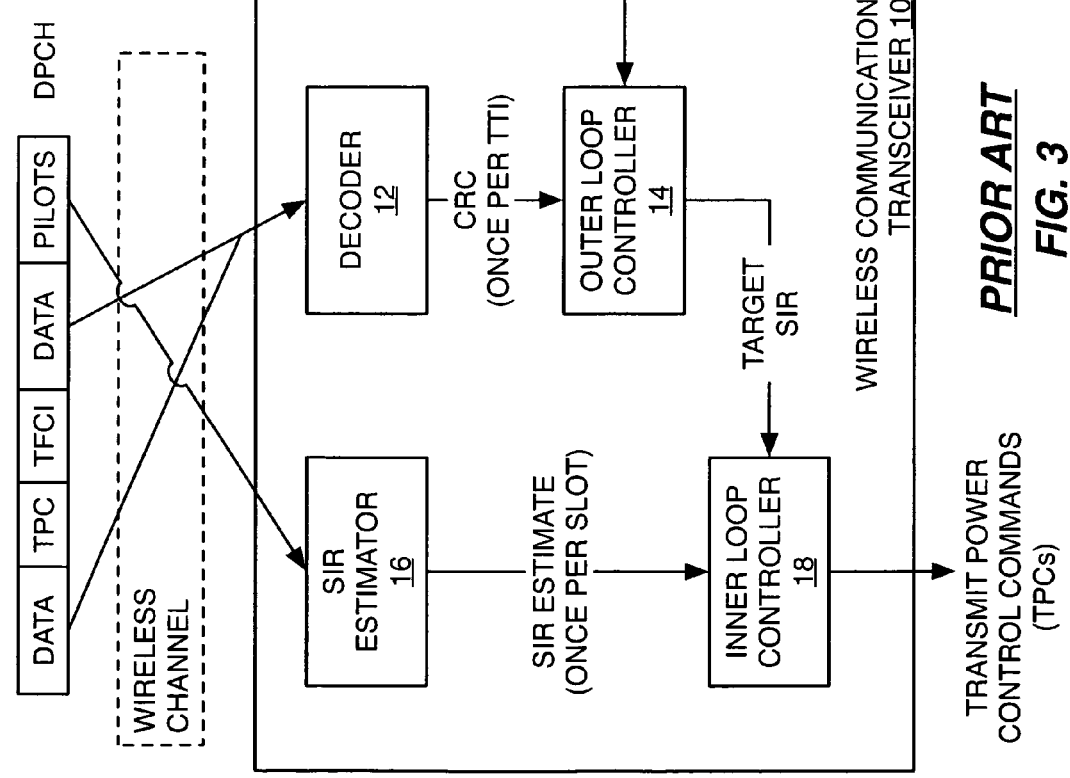
*PRIOR ART*
*FIG. 1*
*PRIOR ART*
*FIG. 2*
*PRIOR ART*
*FIG. 3*

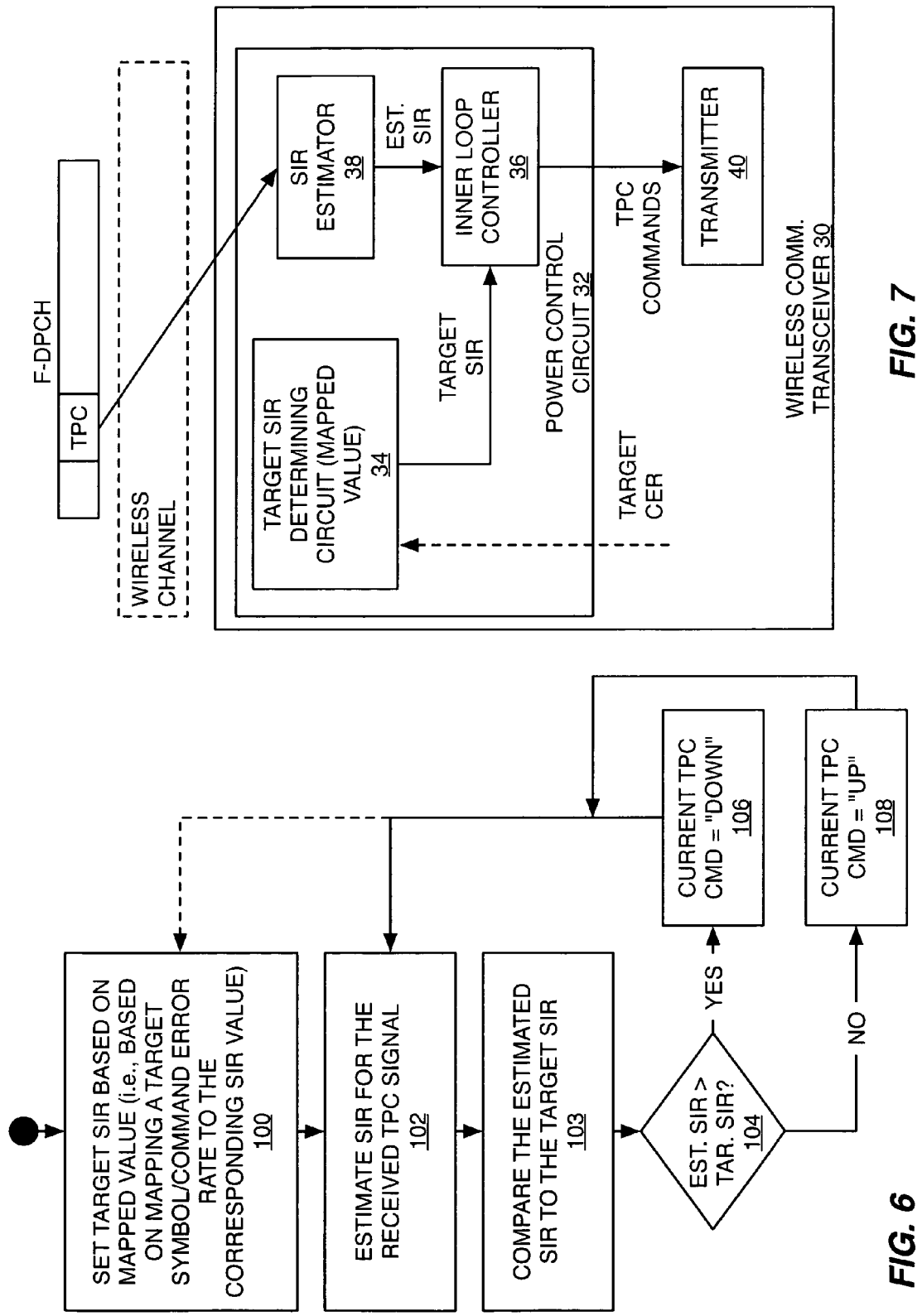

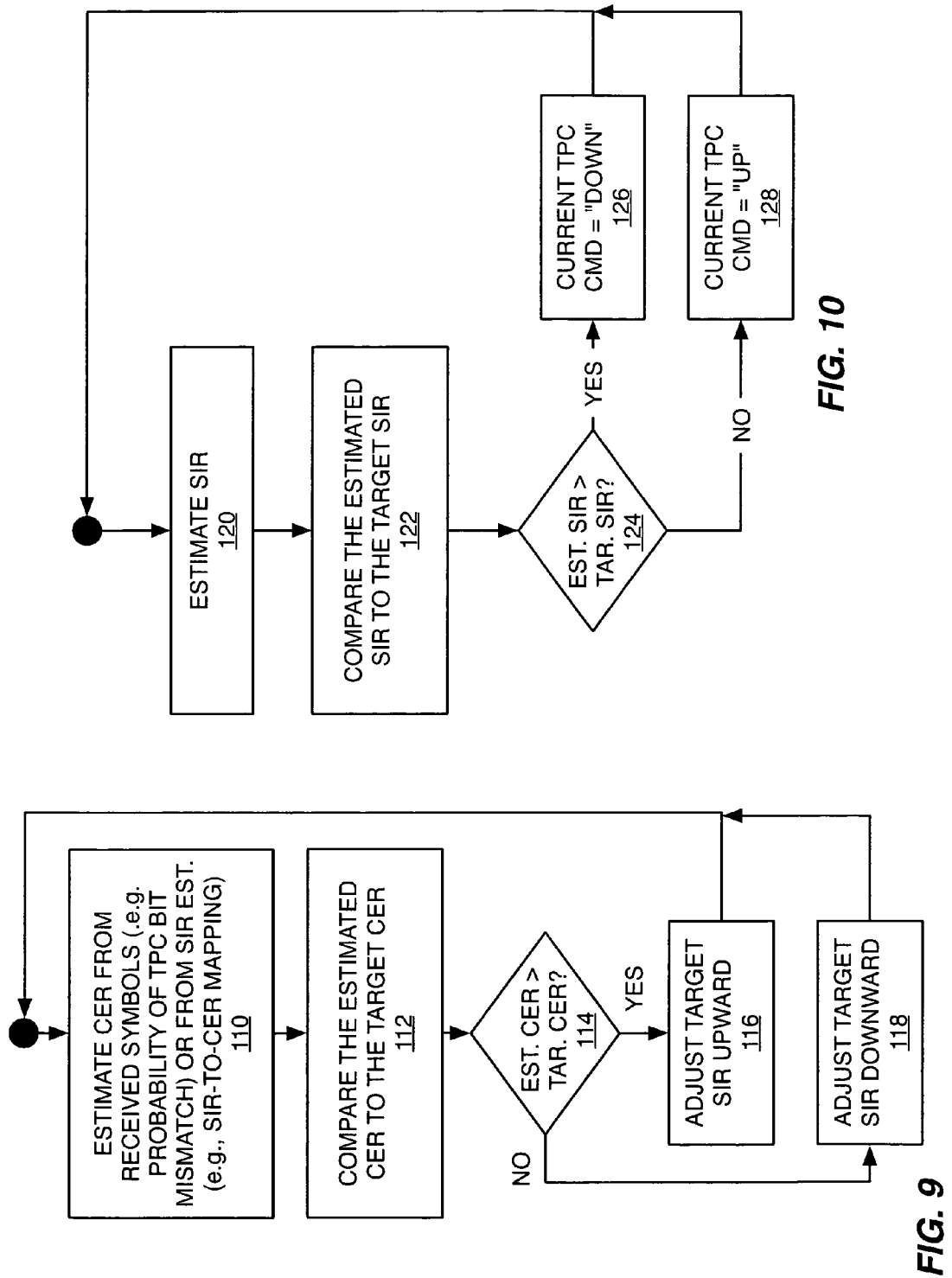

METHOD AND APPARATUS FOR COMMUNICATION CHANNEL ERROR RATE ESTIMATION

RELATED APPLICATIONS

This application claims priority under 35 U.S.C. §119(e) from U.S. provisional patent application Ser. No. 60/683,203 filed on 20 May 2005. The priority application is expressly incorporated in its entirety by reference herein.

BACKGROUND

The present invention relates to wireless communication systems, and particularly relates to estimating communication channel error rates.

Error rate estimation serves many purposes in wireless communication systems. As one example, the transmit power control mechanisms widely employed in cellular communication networks based on Code Division Multiple Access (CDMA) use channel error rate as a control variable in their power adjustment algorithms. More particularly, CDMA-based radio base stations generally control the reverse link transmit powers of the mobile stations being supported by them based on transmitting Transmit Power Control (TPC) bits to the mobile stations. Similarly, each mobile station generally controls the forward link transmit power of the radio base station(s) transmitting to it on a dedicated forward link traffic channel by transmitting TPC bits to the radio base station(s).

The transmitted TPC bits generally take on one of two values: a logical "1" or "UP" command to indicate that the remote transmitter should increase its transmit power, and a logical "0" or "DOWN" command to indicate that the remote transmitter should decrease its transmit power. The value of each TPC bit is determined by comparing the received pilot signal with a signal strength target, usually expressed as a Signal-to-Noise Ratio. For a given measurement interval, the receiver compares the received pilot signal strength to the target and transmits a DOWN command if the received pilot signal strength is above the target and transmits an UP command if the received pilot signal strength is below the target. By making the comparison many times per second, the receiver generates a steady stream of TPC bits, thereby keeping the received pilot signal strength at the target. Generally, the transmitter transmitting the pilot signal also transmits one or more traffic channels at defined traffic-to-pilot power ratios, meaning that power control of the pilot signal operates as power control of the associated traffic channel(s).

Such received signal strength processing carries the label "inner loop" power control and, as the name suggests, inner loop power control generally is paired with "outer loop" power control. While the inner loop power control process ensures that the received pilot signal strength is kept at the target, the outer loop power control process ensures that the appropriate target is being used by the inner loop power control.

For example, outer loop power control commonly computes or predicts an error rate for the data being received in association with pilot signal reception and compares that to a defined upper error limit, e.g., 10%. Such error rates usually are expressed as Block Error Rates (BLERs) or Bit Error Rates (BERs). Regardless, if the error rate exceeds the defined upper limit, the outer loop power control adjusts the inner loop's target upward. Conversely, if the error rate falls below a lower limit, e.g., 1%, the outer loop power control adjusts the inner loop's target downward.

Implicit in the above description of outer loop power control is the availability of "coded" data for determining reception error rates—i.e., data that includes or is accompanied by error detection and/or error correction information. Without coded or known data, such as pilot bits, no explicit control variable exists for assessing reception error performance and thus no explicit basis exists for determining the up and down adjustments of the inner loop power control target. The Fractional Dedicated Physical Channel (F-DPCH) recently introduced in the Wideband CDMA (WCDMA) standards includes power control information (e.g., TPC bits), but does not include data with error correction information. Thus, the F-DPCH exemplifies the type of channel that complicates the traditional inner/outer loop power control approach.

SUMMARY

In one embodiment taught herein, a method of generating transmit power control feedback for a power control channel comprises receiving power control commands over the power control channel, estimating a signal quality for the power control channel, estimating a command error rate (CER) for the received power control commands, adjusting a target signal quality by comparing the estimated CER to a target CER, and generating transmit power control feedback for the power control channel by comparing the estimated signal quality to a target signal quality. Adjusting the target signal quality may comprise incrementing the target signal quality if the estimated CER exceeds the target CER and decrementing the target signal quality if the estimated CER is below the target CER. Note that, in this and in other embodiments, the estimated and target signal qualities may be, for example, expressed as signal-to-interference ratios (SIRs), where the interference may include impairments such as inter cell interference, intra cell interference, and thermal noise.

The received power control commands in one or more embodiments nominally comprise matched-bit symbols. In such embodiments, one method of estimating a CER for the power control commands comprises calculating a reception error probability for the received power control commands as a function of detecting mismatched bits in the received power control commands, and mapping the reception error probability to a corresponding CER value according to a defined probability-to-CER mapping function. The probability-to-CER mapping function may be implemented using a data lookup table indexed by probability value, for example, or using a polynomial function based on the probability-to-CER mapping curve.

In other embodiments, the power control commands comprise symbols, at least some which include known bits, e.g., reference bits, or the power control commands are interspersed with reference symbols. In such cases, CER estimation may comprise detecting reception errors of the reference bits/symbols.

In still other embodiments, CER estimation comprises mapping the estimated signal quality to a corresponding CER value according to a defined signal-quality-to-CER mapping function. In such embodiments, a wireless communication transceiver may be preconfigured with a target CER, or with a correspondingly mapped signal quality value, or the mapping may be done dynamically to allow for dynamically setting the target CER.

A wireless communication device may implement any of the above embodiments, or variations of them, such as by including an appropriately configured power control circuit. In one embodiment, the power control circuit comprises one or more processing circuits, including a signal quality estimation circuit configured to estimate the signal quality for the power control channel, a CER estimation circuit configured to estimate the CER for the received power control commands, an outer loop power control circuit configured to adjust the target signal quality, and an inner loop power control circuit configured to generate the transmit power control feedback. The outer loop power control circuit and the CER estimation circuit may be omitted in embodiments where the inner loop power control circuit uses a mapped signal quality value as its target signal quality.

Of course, the present invention is not limited to the above features and advantages. Those skilled in the art will appreciate additional features and advantages of the present invention upon reading the following discussion, and upon viewing the accompanying drawings.

BRIEF DESCRIPTION OF THE DRAWINGS

FIGS. 1-3 relate to conventional generation of power control feedback for a power control channel that includes error-coding for BER estimation.

FIG. 6 is a logic flow diagram illustrating processing logic for one embodiment of generating transmit power control feedback, such as for power control commands received on an F-DPCH in WCDMA systems, based on using a defined SIR-to-CER mapping function, such as the one shown in FIG. 5.

FIG. 7 is a block diagram illustrating one embodiment of a functional circuit arrangement that may be implemented in a power control circuit configured according to the processing logic of FIG. 6.

FIGS. 9 and 10 are logic flow diagrams illustrating processing logic for one embodiment of generating transmit power control feedback, such as for power control commands received on an F-DPCH in WCDMA systems, based on using a defined probability-to-CER mapping function, such as the one shown in FIG. 8.

DETAILED DESCRIPTION

Figure 4:
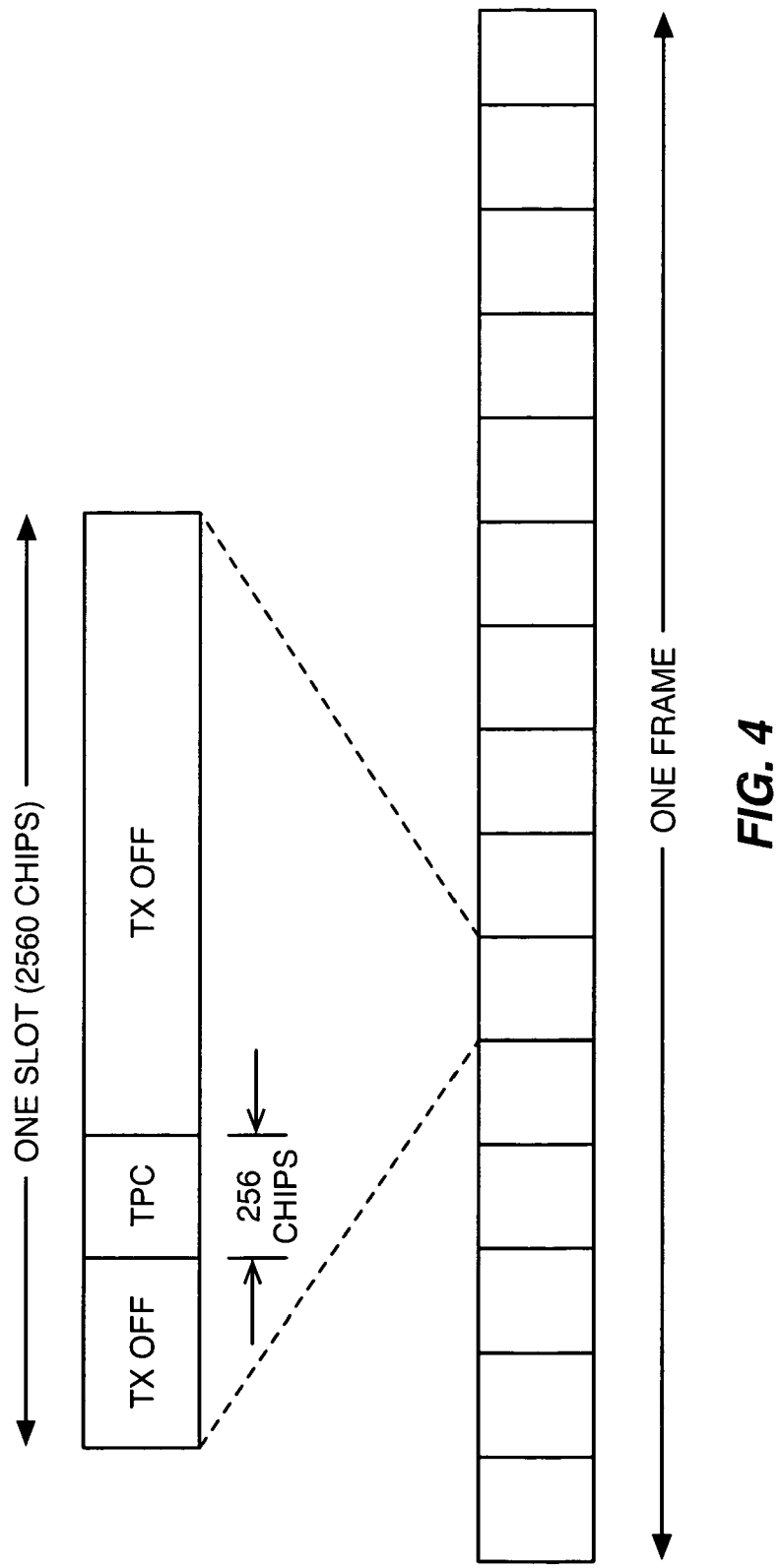
FIG. 4 is a logical diagram of an F-DPCH, such as used by WCDMA systems, wherein the power control channel lacks error-coding that otherwise might serve as the basis for error rate estimation for use in generating power control feedback.

FIG. 1 illustrates a conventional approach to forward link (FL) and reverse link (RL) transmit power control as adopted in CDMA-based wireless communication networks. A first transceiver 8 (e.g., a radio base station or RBS) transmits FL data and power control commands to a second transceiver 10 (e.g., a mobile station or MS). In turn, the second transceiver 10 transmits RL data and power control commands to the first transceiver 8. Within this framework, the second transceiver 10 adjusts its RL transmit power up and down responsive to the power control commands received by it on the FL from the first transceiver 8. Reciprocally, the first transceiver 8 adjusts its FL transmit power up and down responsive to the power control commands received by it on the RL from the second transceiver 10.

The first transceiver 8 generates the power control commands being sent to the second transceiver 10 on the FL based on whether it is receiving the RL transmissions from the second transceiver 10 above or below a targeted signal quality, usually expressed in dBs. In turn, the second transceiver 10 generates the power control commands being sent to the first transceiver 8 on the RL based on whether it is receiving the FL transmissions from the first transceiver 8 above or below a targeted signal quality. Thus, each transceiver provides the other with power control feedback to ensure that their respective transmissions are received at acceptable signal strengths. FIG. 2 illustrates power control in this manner, wherein the controlled SIR of a received signal is maintained at or about the targeted SIR through the use of power control feedback.

FIG. 3 uses the transceiver 10 as the basis for illustrating further details of the conventional power control approach. As illustrated, the transceiver 10 receives a communication signal—a Dedicated Physical Channel (DPCH) is shown—that includes data (user traffic), pilots, and power control commands. The transceiver 10 uses the received pilot information to estimate properties of the wireless channel, and then decodes the received data using the channel estimates and error correction/detection information included with the data. More particularly, a decoder 12 uses Cyclic Redundancy Check (CRC) or other error coding information to detect received data errors, and an outer loop controller 14 uses that information to measure an error rate for the received data, which may be expressed in a number of ways, such as a Block Error Rate (BLER), a Frame Error Rate (FER), or a Bit Error Rate (BER).

Regardless, an outer loop controller 14 compares the measured error rate to a reference error rate (e.g., a reference or target BLER). If the measured error rate exceeds the target error rate, the outer loop controller 14 adjusts a target SIR upward. Conversely, if the measured error rate is below the same or a different target error rate, the outer loop controller 14 adjusts the target SIR downward. For example, if the measured error rate exceeds ten percent, the outer loop controller 14 adjusts the target SIR upward and if the measured error rate falls below one percent, the outer loop controller 14 adjusts the target SIR downward. Such ongoing adjustment of the target SIR influences the remote transmitter's transmit power because an inner loop controller 18 generates transmit power control commands for the remote transmitter as "up" or "down" values, depending on whether the signal quality, e.g., SIR, is above or below the SIR target.

Two notable points stand out in the context of conventional power control as just described. First, the power control bits sent from the transceiver 8 to the transceiver 10 for controlling the transmit power of the transceiver 10 are included within the data being sent to the transceiver 10. Because the transceiver 10 provides power control feedback to ensure that the transceiver 8 transmits this data at a high-enough power to ensure reliable data reception, the power control information from transceiver 8 is "automatically" sent at a transmit power that ensures reliable reception at the transceiver 10. Second, the entire basis for adjusting the target SIR at the transceiver 10 is whether the measured error rate for the received data is above or below acceptable (targeted) rates. Without the ability to make such measurements, the outer loop controller 14 would have no basis for adjusting the target SIR used by the inner loop controller 18.

With these points in mind, one skilled in the art will recognize the challenges arising in generating power control feedback for received signals that lack error coded or known data that can be used as the basis for determining the received signal's BLER, FER, etc. By way of non-limiting example, FIG. 4 illustrates a Fractional Dedicated Physical Channel (F-DPCH), which is a type of channel defined by the WCDMA standards for conveying power control information to a number of remote transceivers. For example, a base station in a WCDMA network may use an F-DPCH to transmit power control information to a plurality of mobile stations.

Because the transmitted power control information is used to control the reverse link transmit powers of those mobile stations, it is important that the power control information be transmitted at the appropriate power level. However, it is difficult for the mobile stations to determine whether the power control information incoming on the received F-DPCH is being transmitted at a high enough power, because there is no error-coded or known data that can be assessed for an indication of received data error rates. More particularly, as regards the F-DPCH, a given mobile station simply receives incoming power control commands and is left without any clear mechanism for generating power control feedback to ensure that those incoming power control commands—e.g., TPCs—are being transmitted to it by the radio base station at the correct power level.

According to one embodiment of generating power control feedback as taught herein, a communication transceiver—e.g., mobile station, radio base station, etc.—adjusts its transmit power responsive to incoming power control commands received over a power control channel, and generates power control feedback for the remote transmitter that is originating those commands based on estimating a signal quality, such as an SIR, for the power control channel, and generating the transmit power control feedback by comparing the estimated SIR to a target SIR determined by mapping a target CER to a corresponding SIR value according to a defined SIR-to-CER mapping function. That is, the mobile station is programmed with, or dynamically calculates, a target CER representing, for example, the upper limit on tolerable (power control) command error rates. The SIR-to-CER mapping function thus provides the basis for identifying the SIR value corresponding to the target CER. Another embodiment comprises a computer readable medium storing a computer program for generating transmit power control feedback for a power control channel. The computer program comprises: program instructions to receive power control commands over the power control channel; program instructions to estimate a signal quality for the power control channel; and program instructions to generate transmit power control feedback for the power control channel by comparing the estimated signal quality to a target signal quality determined by mapping a target command error rate to a corresponding signal quality value according to a defined signal-quality-to-command-error-rate mapping function.

Figure 5:
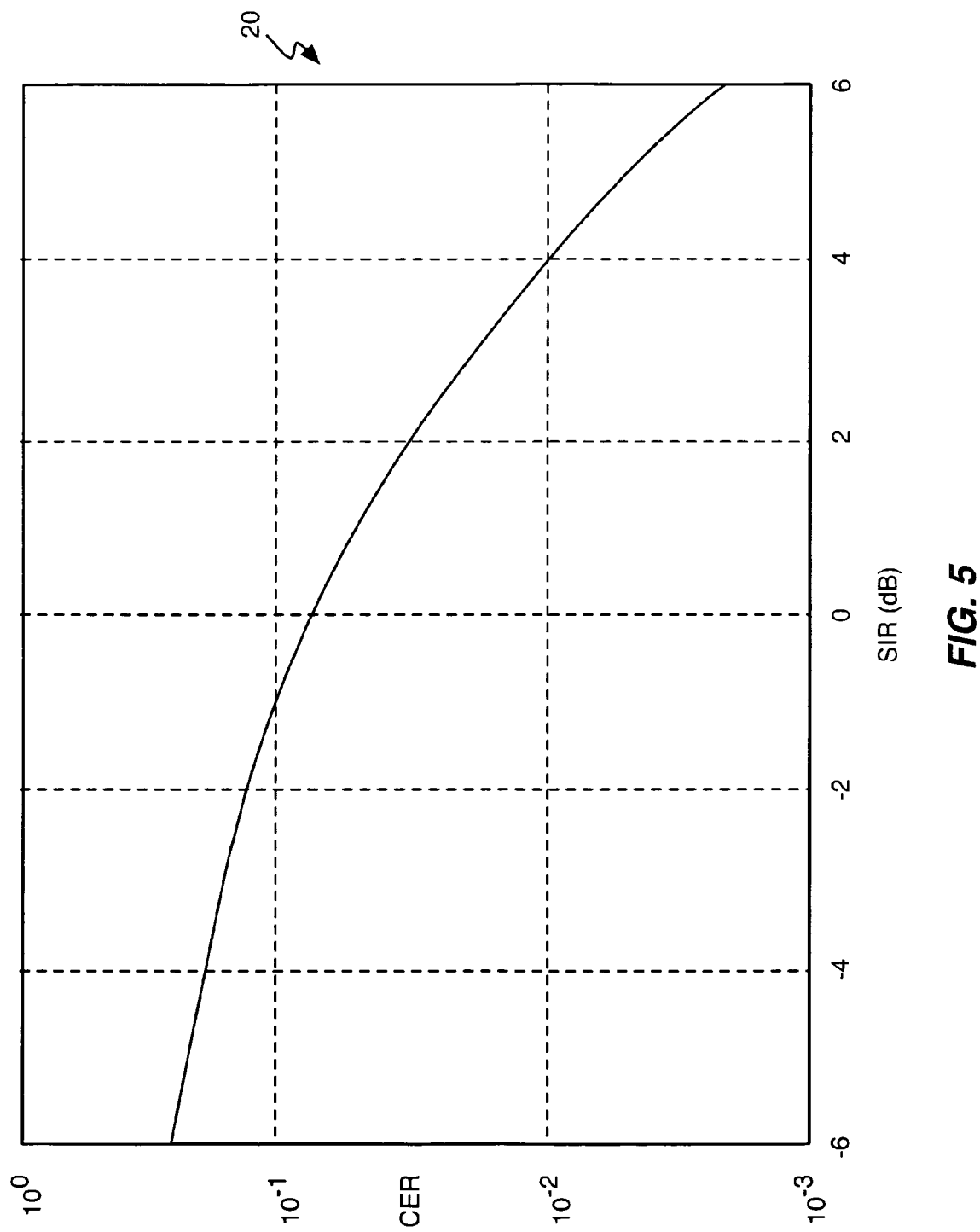
FIG. 5 is a graph of a defined signal-quality-to-command-error-rate mapping function, wherein signal quality is expressed in terms of signal-to-interference ratio (SIR).

FIG. 5 illustrates an SIR-to-CER mapping function 20, shown as a logarithmic plot of CER versus SIR. One sees that a given CER, say $10^{-1}$ (ten percent), can be directly mapped to a corresponding SIR value. Thus, if the mobile station uses that mapped SIR value as its target SIR for generating transmit power control feedback for the received power control channel, it is generally assured that the CER of the power control commands received over that power control channel will not exceed the target CER value.

FIG. 6 illustrates processing logic for implementing power control based on a "mapped" target SIR, wherein processing begins with setting the target SIR based on a mapped value—i.e., setting the target SIR based on mapping a target CER to the corresponding SIR value according to a defined SIR-to-CER mapping (Step 100). Processing continues with estimating the actual SIR of the received signal, e.g., of the TPC symbol conveyed by the received power control channel (Step 102). Processing continues with a comparison between the estimated SIR and the (mapped) target SIR (Steps 103 and 104). If the estimated SIR is above the target SIR, the power control logic sets its output TPC command as "DOWN" (Step 106). Conversely, if the estimated SIR is below the target SIR, the power control logic sets its output TPC command as "UP" (Step 108). In this manner, the power control logic streams UP and DOWN commands back to the remote transmitter, responsive to determining whether the SIR estimated for the received power control channel is above or below the SIR target set by the SIR-to-CER mapping relationship. By way of further example, the processing logic for implementing power control can be implemented via a computer readable medium storing a computer program for generating the transmit power control feedback for a power control channel. The computer program comprises: program instructions to estimate a signal quality for the power control channel; program instructions to estimate a command error rate for power control commands received on the power control channel according to a mapping function that maps estimated signal quality for the power control channel to command error rates, or maps a reception error probability calculated for power control commands received over the power control channel to command error rates; program instructions to adjust a target signal quality by comparing the estimated command error rate to a target command error rate; and program instructions to generate transmit power control feedback for the power control channel by comparing the estimated signal quality to the target signal quality.

To better understand this processing approach, it may be helpful to provide details in the context of the power control commands incoming to a particular mobile station on an F-DPCH, but this should be understood as a non-limiting example of power control feedback generation as taught herein. The power control commands on an F-DPCH are transmitted as symbols. More particularly, each power control command comprises a two-bit TPC command symbol. Assuming that the mobile station uses some form of RAKE receiver, the received TPC symbol per (RAKE) finger, $y_f(k)$, can be modeled as $$y_f(k)=g(k)h_f(k)u(k)+e_f(k) \quad \text{Eq. 1}$$

where $u(k)$ is the transmitted symbol, $e_f(k)$ is Gaussian interference, $h_f(k)$ is the channel response estimated from the Common Pilot Channel (CPICH) received in association with the F-DPCH, and $g(t)>0$ is the real gain offset used on the F-PDCH relative to the CPICH. Further, for Eq. 1, note that the expected value and the variance value, respectively, becomes $$E(e_f)=0 \quad \text{Eq. 2}$$

$$E(|e_f|^2)=I_f \quad \text{Eq. 3}$$

where $I_f$ is the interference power per received symbol on finger f of the receiver. Note, too, that with an F-DPCH spreading factor of 256, a relationship between the Gaussian interference $e_f(k)$ and the per-symbol Signal-to-Noise Ratio (SIR), $\left(\frac{E_s}{N_o}\right)_f,$ for finger f of the receiver can be expressed as $$\frac{|gh_f|^2}{I_f} = \left(\frac{E_s}{N_o}\right)_f = 256 \cdot \left(\frac{E_c}{I_o}\right)_f \qquad \text{Eq. 4}$$

where $E_s$ is the received signal energy per symbol, $E_c$ is the received signal per-chip energy, $N_o$ is the received noise power, and $I_o$ is the received interference power.

With the above in mind, a beginning point in the analysis of error rate determination for the F-DPCH begins with noting that two different TPC command symbols are possible, but the underlying symbol modulation is the same for both command symbols. Thus, the TPC command symbols can be expressed as $$u = u_o \cdot \text{TPC} \qquad \text{Eq. 5}$$

where $\text{TPC} \in \{-1, 1\}$ is the TPC command (where $-1$ represents a logical down and vice versa) and the base (unsigned) modulation symbol is $$u_o = \frac{(1+i)}{\sqrt{2}} \qquad \text{Eq. 6}$$

The received TPC commands (i.e., the received TPC symbols) can be estimated using maximum ratio combining as $$TPC_{est} = \text{sign}\left(\text{Re}\left(u_o^* \sum_{f=1}^{N_f} \frac{\hat{y}_f \hat{h}_f^*}{\hat{I}_f}\right)\right) \qquad \text{Eq. 7}$$

where $\hat{h}_f$ and $\hat{I}_f$ may be estimated from the CPICH. From Eq. 7, one sees that the receiver does not need to know the value of the gain offset g to decode the received TPC symbols; rather, it is enough to know that $g > 0$.

The individual TPC symbol bits, $TPC_r$ and $TPC_i$ can be estimated as $$TPC_{est,r} = \text{Re} \sum_{f=1}^{N_f} \frac{\hat{y}_f \hat{h}_f^*}{\hat{I}_f} \text{ and} \qquad \text{Eq. 8}$$

$$TPC_{est,i} = \text{Im} \sum_{f=1}^{N_f} \frac{\hat{y}_f \hat{h}_f^*}{\hat{I}_f} \qquad \text{Eq. 9}$$

Further, both transmitted bits in each TPC symbol are, by definition, equal. Thus, each estimated TPC symbol may be expressed as $$TPC_{est} = \text{sign}(Re(u_o^* \cdot (TPC_{est,r} + i \cdot TPC_{est,i}))) \qquad \text{Eq. 10}$$

where both $\hat{h}_f$ and $\hat{I}_f$ are estimated based on the CPICH.

With the above relationships in mind, the SIR of the F-DPCH can be estimated as $$\frac{\hat{E}_s}{\hat{N}_o} = \left(-N_f + \sum_{f=1}^{N_f} \frac{|y_f|^2}{\hat{I}_f}\right) \qquad \text{Eq. 11}$$

Note that it is possible to use the received signal power $|y_f|^2$ directly without computing a channel estimate, because with only one TPC symbol $|(gh_f)_{est}| = |y_f u^*| = |y_f|$. Also, note that the estimate obtained in Eq. 11 may be improved using both pilot bits on the CPICH and TPC bits. Further, an SIR estimate utilizing the CPICH channel estimate and an estimate of the gain offset g can be obtained as $$\frac{\hat{E}_s}{\hat{N}_o} = \left(-N_f + \hat{g}^2 \sum_{f=1}^{N_f} \frac{|\hat{h}_f|^2}{\hat{I}_f}\right) \qquad \text{Eq. 12}$$

where the estimated gain offset $\hat{g}$ can be determined by filtering and feed forward of the TPC commands previously transmitted by the mobile station (to the base station). Continuing with the analysis, the estimated gain offset may be calculated as $$\hat{g}(k) = \alpha \cdot 10^{\frac{-1 \cdot TPC(k-d)}{10}} \cdot \hat{g}(k-1) + (1-\alpha) \cdot \frac{\left|u_o^* \Sigma_f \frac{y_f(k) \hat{h}_f^*(k)}{\hat{I}_f(k)}\right|}{\left|\Sigma_f \frac{|\hat{h}_f(k)|^2}{\hat{I}_f(k)}\right|} \qquad \text{Eq. 13}$$

where d is a TPC command delay and $\alpha$ is a selected filter constant.

In another embodiment that bases SIR estimation for the F-DPCH on the CPICH, the (RAKE) receiver outputs for the TPC symbol received in the kth slot of the ith frame can be expressed as, $$z_i(k) = \lambda g_i(k) c_i(k) u_i(k) + e_i(k) \qquad \text{Eq. 14}$$

where $\lambda$ is an initial gain level of the F-DPCH, $g_i(k)$ is the gain offset determined by reverse link TPC commands, $c_i(k)$ is determined by the net response and combining weights, $u_i(k)$ is the TPC symbol value, and $e_i(k)$ is the noise sample. Here, the net response accounts for transmitter pulse waveform, radio channel, and received waveform. The analysis assumes that $g_i(k)$ follows the reverse link TPC commands (sent by the mobile station) and, as a result, the product of $g_i(k)$, $c_i(k)$, and $\hat{u}_i(k)$, namely $v_i(k) = g_i(k) c_i(k) \hat{u}_i(k)$, is assumed known. To prevent error propagation due to reverse link TPC command reception errors or the base station not following reverse link TPC commands, the gain offset $g_i(k)$ can be reset to 1 during the last slot of every F-DPCH frame, i.e., $g_i(M-1) = 1$, where M is the number of slots per frame.

Collecting $z_i(k)$, $v_i(k)$, and $e_i(k)$ from all slots in a frame into a vector, $$z_i = \lambda v_i + e_i \qquad \text{Eq. 15}$$

The least-squares (LS) estimate of $\lambda$ based on Eq. 15 can be expressed as $$\hat{\lambda}(i) = \frac{\text{Re}(v_i^H z_i)}{|v_i|^2} \qquad \text{Eq. 16}$$

It can be shown that the estimator in Eq. 16 is also a minimum mean-square error (MMSE) estimator.

According to such estimation, the estimated gain difference $\hat{\lambda}(i-1)$ from frame $i-1$ can be used to produce an SIR estimation, which may be expressed as an estimate of the SIR in each slot in frame $i$. For example, if RAKE or G-RAKE combining is used, the symbol SIR for the TPC symbol in slot $k$ of frame $i$ is $$\hat{\gamma}_i(k) = \frac{\hat{\lambda}_{i-1}^2 g_i^2(k) w^H h h^H w}{w^H R w} \qquad \text{Eq. 17}$$

where w is the combining weight, h is the net response and R is the covariance matrix for the interference from different fingers. Estimates of h and R can be obtained from the CPICH. Note that the power offset between the CPICH and the F-DPCH during the first slot of a frame is folded into $\lambda$. Further, note that the expression $$\frac{w^H h h^H w}{w^H R w} \qquad \text{Eq. 18}$$

corresponds to CPICH symbol SIR. If Generalized RAKE (G-RAKE) combining is used, this simplifies to $$\hat{\gamma}_i(k) = \hat{\lambda}_{i-1}^2 g_i^2(k) h^H R^{-1} h \qquad \text{Eq. 19}$$

where, again, $h^H R^{-1} h$ corresponds to CPICH symbol SIR.

Using the above analytical framework, and returning to the plot of FIG. 5, it will be understood that an additive white Gaussian noise (AWGN) map between the SIR and CER is relatively channel independent, making it possible to directly map the CER target to an SIR target, thereby making conventional outer loop power control superfluous. (Note, too, that the AWGN map obviously is valid for an AWGN channel, but also is a good approximation for other types of channels.) More particularly, assuming that $\hat{h}_f$ and $\hat{I}_f$ are good approximations of $h_f$ and $I_f$, it may be realized that $$TPC_{est} = \text{sign}(TPC + n) \qquad \text{Eq. 20}$$

where $$n = \text{Re}\left( \frac{u_o^* \cdot \sum_f \frac{h_f^* e_f}{I_f}}{g \cdot \sum_f \frac{|h_f|^2}{I_f}} \right) \qquad \text{Eq. 21}$$

The TPC command error rate (CER) therefore may be expressed as $$CER = \frac{1}{2} \cdot P(|n| > 1) = P(n > 1) \qquad \text{Eq. 22}$$

and the variance of n (assuming uncorrelated finger noise) is given by $$E(n^2) = \frac{1}{2\left(g^2 \cdot \sum_f \frac{|h_f|^2}{I_f}\right)} = \frac{1}{2 \cdot E_s / N_o} \qquad \text{Eq. 23}$$

Thus, with Eq. 23, the CER is given as a function of SIR ($E_s/N_o$), such as is depicted in FIG. 5, and one sees that this functional mapping may be used to identify a target SIR for inner loop power control that corresponds to the desired (target) CER.

FIG. 7 illustrates one embodiment of a wireless communication transceiver 30 that comprises all or part of a wireless communication device or system. By way of non-limiting example, such a device may comprise a mobile station, such as a cellular radiotelephone, or may comprise a wireless pager, a Portable Digital Assistant (PDA), a laptop or palmtop computer, or a communication module therein. In any case, the transceiver 30 is configured to generate transmit power control feedback for a received power control channel (e.g., a received F-DPCH signal) according to the above-described SIR-to-CER mapping.

In more detail, the transceiver 30, which may be a mobile station, includes a power control circuit 32 that includes one or more processing circuits configured to receive power control commands over the power control channel, estimating an SIR for the power control channel, and generating transmit power control feedback for the power control channel by comparing the estimated SIR to a target SIR determined by mapping a target CER to a corresponding SIR value according to a defined SIR-to-CER mapping function. The SIR-to-CER mapping function may be as shown in FIG. 5, and the SIR estimation may be as given by Eq. 11, for example.

It should be understood that the power control circuit 32 may comprise one or more microprocessors, Digital Signal Processors (DSPs), or other types of processing circuits. (More generally, it should be understood that the power control circuit 32 can be implemented in hardware, software, or essentially any combination thereof.) In at least one functional circuit arrangement, the power control circuit 32 comprises a target SIR determining circuit 34, an inner loop controller 36, and an SIR estimation circuit 38. The target SIR determining circuit 34 may comprise a memory lookup circuit that is configured to read a pre-mapped SIR value from memory, or may comprise a functional mapping circuit that is configured to determine the target SIR by mapping a target CER to the corresponding SIR value according to a polynomial function or a table lookup function embodying an SIR-to-CER mapping function.

The inner loop controller 36 thus uses the (mapped) target SIR for comparison to the estimated SIR, and generates power control feedback for the received power control channel in the form of TPC commands, which may be transmitted by a transmitter circuit 40 of the transceiver 30. The SIR estimation circuit 38 provides SIR estimates to the inner loop controller 36 based on carrying out Eq. 11 and/or Eq. 12, for example.

Figure 8:
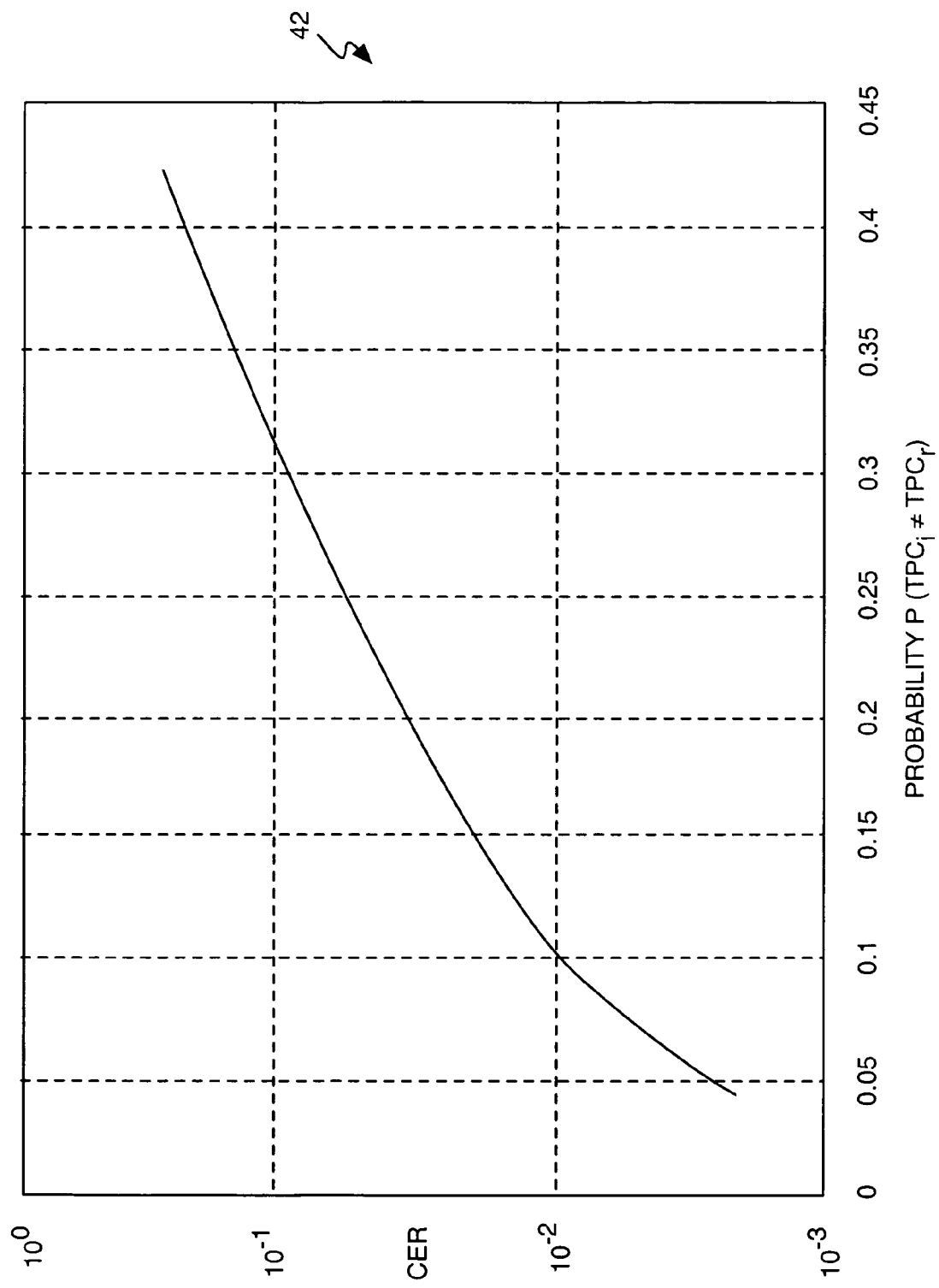
FIG. 8 is a graph of a defined (reception error) probability-to-CER mapping function.

FIG. 8 illustrates another embodiment based on mapping, wherein a probability-to-CER mapping function 42 is shown as a logarithmic plot of CER versus power control command reception error probability P, that is the probability of unequal TPC bits in one TPC symbol. For example, one sees that a CER of ten percent corresponds to a command reception error probability of roughly thirty percent, and a CER of one percent corresponds to a ten percent probability of reception error.

It should be noted that the power control circuit 32 can be configured to detect mismatched bits based on hard bit value comparisons (e.g., +1, −1) or soft bit value comparisons (e.g., +0.99, +0.33). For soft value mismatch detection, for example, the power control circuit 32 can be configured to detect TPC bit mismatch in a received TPC symbol based on evaluating the distance between soft values of the TPC bits. Further, in one or more embodiments, the power control circuit 32 can be configured to estimate the relative soft bit error and map it to CER. The distribution of the relative soft bit error can be quantized using a variance measure (as an intermediate measure) before being mapped into a CER. In another embodiment, the power control circuit 32 can be configured to detect erroneously received power control commands by detecting mismatched bits and counting the mismatch errors.

FIG. 9 illustrates one embodiment of processing logic based on the probability-to-CER mapping function that may be embodied in the power control circuit 32 of the transceiver 30. Processing begins with estimation of the CER based on the determination of the reception error probability for the power control commands received over the power control channel (Step 110). Note, too, in a variation of this embodiment, the CER may be estimated from the estimated SIR, as was detailed in the context of the SIR-to-CER mapping function 20 illustrated in FIG. 5.

Processing continues with a comparison of the estimated CER to a target CER (Step 112), which may be stored in a memory of the transceiver 30 as a pre-configured value, or as a dynamically received or updated value. If the estimated CER is greater than the target CER (Step 114), the power control circuit 32 adjusts the target SIR upward (Step 116). Conversely, if the estimated CER is less than the target CER, or less than a defined fraction of the target CER, the power control circuit 32 adjusts the target SIR downward (Step 118).

It should be understood that variations of this logic are contemplated herein. For example, in addition to using different target CER thresholds for increasing and decreasing the target SIR—e.g., increase the target SIR if the estimated CER>ten percent, decrease target SIR if the estimated CER<one percent—the power control circuit may generate more than two command states. As one example, it may generate TPC commands as UP, DOWN, and HOLD, such that it allows the remote transmitter to hold its current transmit power settings, provided the estimated SIR at the transceiver 30 remains within a range between defined upper and lower target SIRs.

In any case, where FIG. 9 illustrates the outer loop portion of power control, FIG. 10 illustrates the complementary inner loop portion, which may be configured to run concurrently with the outer loop power control process of FIG. 9, but generally at a higher execution frequency. For example, the logic of FIG. 10 may run at 800 Hz or faster, such that a new TPC command is generated by the power control circuit 32 at least every 1.25 ms. In contrast, the outer loop power control adjustment of the target SIR illustrated in FIG. 9 may run every 20 ms, 50 ms, or at some other slower rate.

Regardless of its execution frequency, the power control circuit 32 carries out the inner loop processing logic of FIG. 10 by estimating the signal quality, such as the SIR, for TPC symbols received on the received power control channel for the current time interval (slot, frame, etc.) (Step 120), and comparing the estimated signal quality to the target signal quality (as determined according to the processing logic of FIG. 9) (Step 122). For example, an estimated SIR can be compared to a target SIR. If the estimated SIR is greater than the target SIR (Step 124), the TPC command for the current command interval is generated as a DOWN command (Step 126). Conversely, if the estimated SIR is not greater than the target SIR, the TPC command for the current command interval is generated as an UP command (Step 128) to cause the remote transmitter to incrementally increase the transmit power allocated to transmission of the power control channel received at the transceiver 30. Of course, as noted above, additional command states, such as HOLD, may be implemented in some embodiments.

Figure 11:
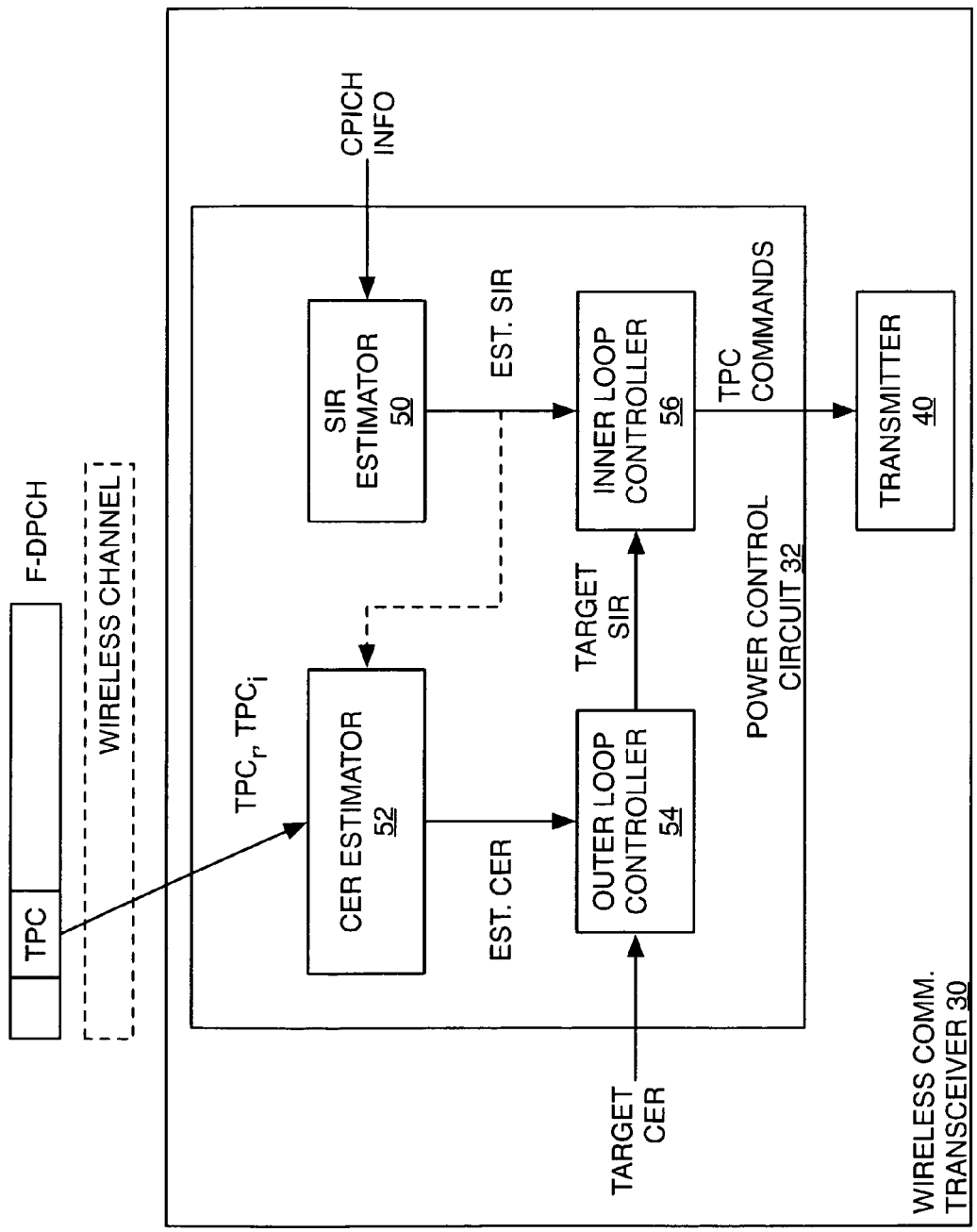
FIG. 11 is a block diagram illustrating one embodiment of a functional circuit arrangement that may be implemented in a power control circuit configured according to the processing logic of FIGS. 9 and 10.

FIG. 11 illustrates an embodiment of the power control circuit 32 that is configured to carry out the processing logic of FIGS. 9 and 10, or variations of that logic. In the illustrated embodiment, the power control circuit 32 comprises an SIR estimation circuit 50, a CER estimation circuit 52, an outer loop controller 54, and an inner loop controller 56.

The CER estimation circuit 52 can be configured to base its CER estimation on the knowledge that both TPC command bits of the power control commands incoming on the received power control channel are equal. (Note that this condition holds true for the two-bit power control command symbols defined by the WCDMA standards for power control over an F-DPCH, but may not be true in other instances, in which case other bases for CER estimation can be used.)

With knowledge that the two bits of each received power control command are by definition equal, the probability that a command with unequal bits will be received can be converted to a CER estimate according to the probability-to-CER function 42 illustrated in FIG. 8. This approach is based on the realization that the relationship between the probability of receiving unequal command bits and the CER is relatively channel independent.

Assuming that the noise on the two estimated soft TPC bits in a given received power control command is uncorrelated, then the probability that the two estimated hard bits are unequal, $TPC_r, TPC_i \in \{1, -1\}$ is given by $$\zeta = P(TPC_r \neq TPC_i) = \frac{SIR}{\pi} \int_{x_1=-\infty}^{0} e^{\frac{-(x_1-1) \cdot SIR}{2}} dx_1 \cdot \int_{x_2=0}^{\infty} e^{\frac{-(x_2-1) \cdot SIR}{2}} dx_2 \quad \text{Eq. 24}$$

where $SIR=E_b/N_o$ is the SIR of the estimated TPC bits, and where the variables $x_1$ and $x_2$ represent received TPC bits in a given power control command when the transmitted bits of that command are both equal to one. The CER is thus given by $$CER = \frac{SIR}{2\pi} \int_{x_1=-\infty}^{0} \int_{x_2=-\infty}^{-x_1} e^{\frac{-(x_1+x_2-2) \cdot SIR}{2}} dx_1 dx_2 \quad \text{Eq. 25}$$

A suitable polynomial approximation of the probability-to-CER mapping function 42, for the interval illustrated in FIG. 8, is given as $$CER_{est} = 2.31 \cdot \zeta^3 + 0.141 \cdot \zeta - 4.91 \cdot 10^{-3} \quad \text{Eq. 26}$$

where the command reception error probability for unequal TPC bits can be estimated as $$\hat{\zeta}_k = \alpha \cdot \hat{\zeta}_{k-1} + (1-\alpha) \frac{1}{2} |TPC_r - TPC_i| \quad \text{Eq. 27}$$

and where $\alpha\in[0,1]$ is a filter constant (for an exponential weighting filter). For WCDMA applications, a suitable value is $\alpha=0.99$ corresponding to a time constant of 100 slots, which complements the expected occurrence of between ten and thirty reception errors (unequal TPC command bits) during this time constant. That frequency of reception error occurrence generally should be enough for good CER estimation performance.

Figure 12:
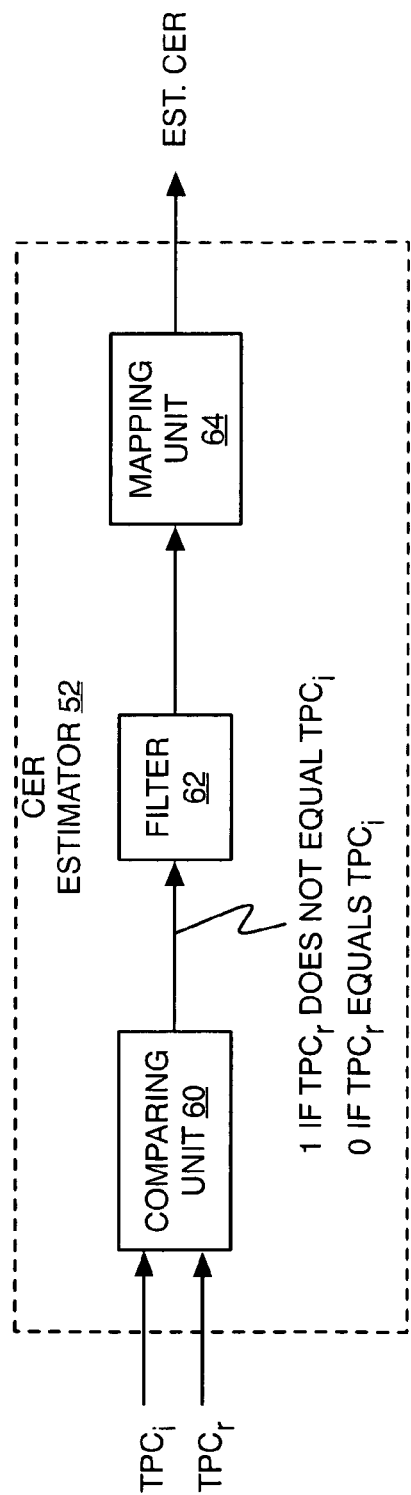
FIG. 12 is a block diagram illustrating one embodiment of a CER estimation circuit.

FIG. 12 illustrates a complementary embodiment of the CER estimation circuit 52, which comprises a comparing unit 60, a filter 62, and a mapping unit 64. The comparing unit 60 compares the bits of incoming TPC commands to detect the (erroneous) reception of unequal bits, and provides a "1" to the filter 62 if the bits of a given received TPC command are unequal, and provides a "0" otherwise. In turn, the filter 62 filters this 1/0 output from the comparing unit 60, and provides the filtered output (e.g., Eq. 27) to the mapping unit 64. The mapping unit 64 uses the filtered output to estimate the CER of the received power control channel according to, for example, Eq. 26.

Figure 13:
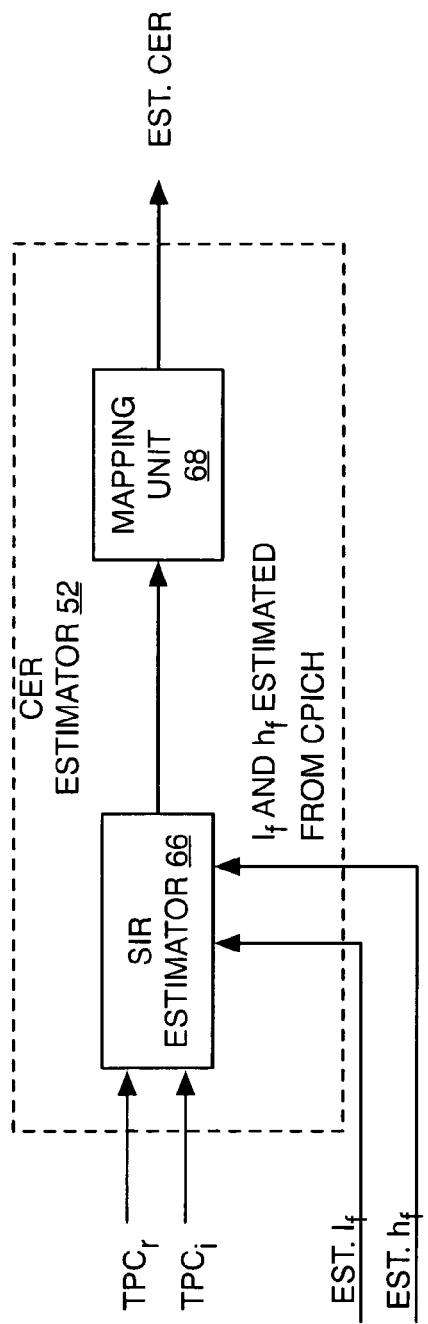
FIG. 13 is a block diagram illustrating another embodiment of a CER estimation circuit.

FIG. 13 illustrates another embodiment of the CER estimation circuit 52 that uses an SIR-to-CER mapping. Thus, the illustrated embodiment of the CER estimation circuit 52 comprises (or is associated with) an SIR estimation circuit 66, which uses the received TPC commands and estimates of $h_f$ and $I_f$ as obtained from the CPICH to generate an SIR estimate for the received power control channel. A mapping unit 68 uses the SIR estimate to identify the corresponding CER value according to, for example, the mapping function 20 illustrated in FIG. 5.

Figure 14:
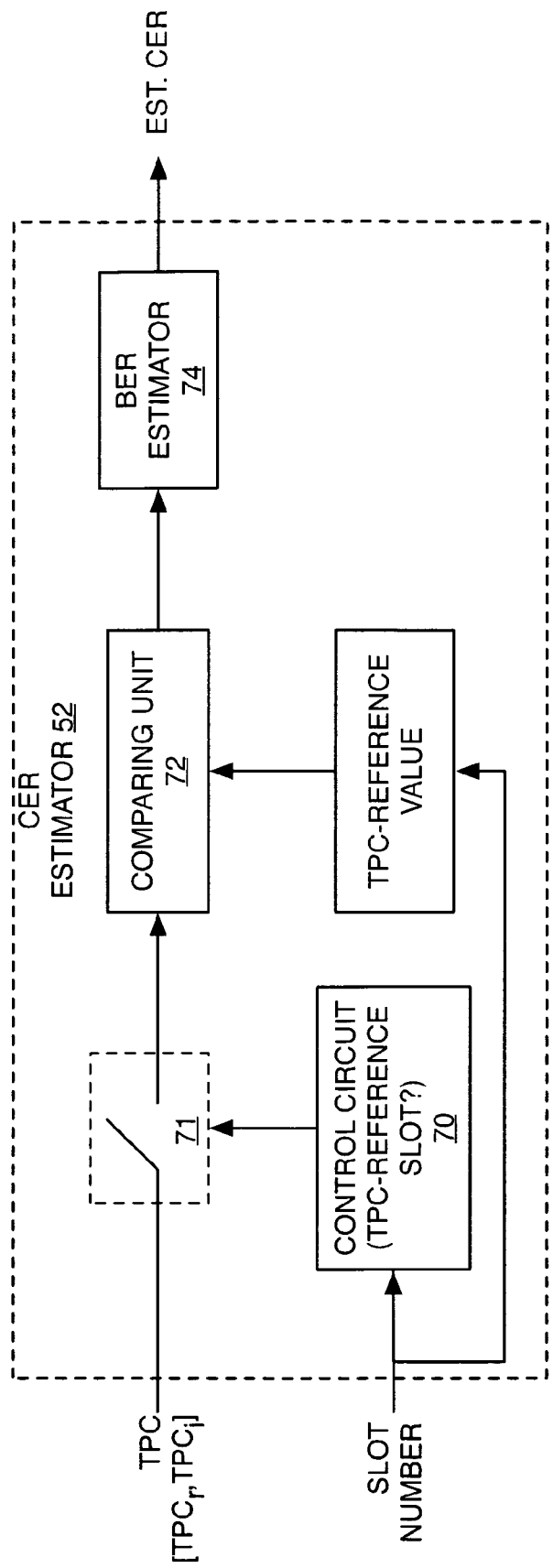
FIG. 14 is a block diagram illustrating another embodiment of a CER estimation circuit.

FIG. 14 illustrates yet another embodiment, which is based on the transmission of known TPC bit values over the power control channel, such that the power control circuit 32 can use its a priori knowledge of the known bits. For such embodiments, the CER estimation circuit 52 may comprise a switch control circuit 70 (to control the illustrated switch 71), a comparing unit 72, and a BER estimator 74. In operation, the control circuit 70 uses the slot number value to distinguish between TPC command bits and the known reference bits and it uses that information to control the switch 71, which determines whether the comparing unit 72 is provided with the current bit(s) as command or reference bits—i.e., the comparing unit 72 may be configured to compare the transmitted bits (as received) with the expected value of those bits.

For reference bits, the comparing unit 72 determines whether the reference bit was received with its appropriate value, and provides an indication as such to the BER estimator 74, which maintains an estimate of bit error rate for the received power control channel. The BER estimate may be used as the CER estimate for outer loop power control by the power control circuit 32.

In one embodiment of this approach, reference symbols are transmitted over the power control channel at non-TPC command positions. Doing so changes the standardized command transmission scheme defined for the F-DPCH, and further reduces the number of transmission slots available on the F-DPCH for power controlling different mobile stations.

As such, in one embodiment, TPC bits in predefined slots of each frame have predefined values, which are known to the transceiver 30. These predefined TPC bits serve as reference bits, making it possible for the power control circuit 32 to estimate a BER/CER directly, based on detection of bit errors. In such contexts, one symbol per frame with known bits may be sufficient for accurate BER estimation, because that rate is roughly the rate at which block error flags are received for BER estimation in conventional outer loop power control based on DPCHs. However, it should be noted that more than one known bit per frame can be used to increase the outer loop control rate and/or to improve the BER/CER estimation process.

As another point of improvement, the known bits can be transmitted symmetrically. That is, the known bits transmitted over the power control channel can comprise a balanced mix of UP and DOWN commands, such that the transmission of known TPC commands as reference bits does not bias the actual power control up or down—i.e., the known bits average out to zero. For example, one might use an even number of known symbols (slots) in each frame, and make half of them UP commands and half of them DOWN commands.

Such an idea also may be applied at the bit level by letting each reference symbol have the bit sequence $\{1,-1\}$ or $\{-1, 1\}$. These bit pairings would, with equal probability, be interpreted as UP commands or DOWN commands. The allowed number of reference symbols during a frame will, in this case, not be limited to an even number.

In yet another alternative embodiment, the device or system transmitting the power control channel to the transceiver 30 may include a known (reference) bit and a command (TPC) bit in selected ones of the transmitted symbols. That is, for at least some of the symbols transmitted on the power control channel, one bit represents a power control command, and one bit represents a reference bit known a priori at the transceiver 30. With such embodiments, there generally should be an even number of slots divided in this way and an equal number of reference bits with the values 1 and −1.

Broadly, then, the present invention as taught herein comprises the generation of power control feedback for a received communication signal that does not include error-coded data that otherwise could be used for determining a BER/CER as the basis for controlling the generating of the power control feedback. Thus, in one or more embodiments, the power control feedback is implemented by setting the inner loop SIR target as the SIR value determined by an SIR-to-CER mapping function. Such embodiments effectively eliminate the outer loop power control, because the inner loop target is mapped directly from a desired target CER. Other embodiments use inner and outer loop power control, but estimate the CER for the received power control channel based on determining a reception error probability for the received power control commands and mapping that probability to a CER estimate according to a defined probability-to-CER mapping function—a variation on this embodiment uses SIR-to-CER mapping. In still other embodiments, the power control channel includes reference bits, and these are used to determine BER/CER estimates for the received power control channel, which are then used to adjust the inner loop target.

Therefore, it should be understood that the present invention is capable of a number of implementation variations and is not limited by the foregoing discussion, or by the accompanying drawings. Rather, the present invention is limited only by the following claims and their legal equivalents.

What is claimed is:

1. A method of generating transmit power control feedback for a power control channel comprising:

receiving power control commands over the power control channel;

estimating a signal quality for the power control channel;

estimating a command error rate for the received power control commands according to a mapping function that maps estimated signal quality for the power control channel to command error rates, or maps a reception error probability calculated for power control commands received over the power control channel to command error rates;

adjusting a target signal quality by comparing the estimated command error rate to a target command error rate; and generating transmit power control feedback for the power control channel by comparing the estimated signal quality to the target signal quality.

2. The method of claim 1, wherein the received power control commands nominally comprise matched-bit symbols, and wherein estimating a command error rate comprises calculating the reception error probability for the received power control commands as a function of detecting mismatched bits in the received power control commands, and mapping the reception error probability to a corresponding command error rate value according to a defined probability-to-command-error-rate mapping function.

3. The method of claim 2, wherein the defined probability-to-command-error-rate mapping function comprises a defined polynomial expression or a data lookup table.

4. The method of claim 2, wherein calculating the reception error probability comprises generating a difference value for each received power control command, wherein the difference value is non-zero if the received power control command includes mismatched bits, and filtering the difference values according to an exponential weighting filter to obtain the reception error probability.

5. The method of claim 2, wherein detecting mismatched bits in the received power control commands comprises detecting hard bit errors.

6. The method of claim 2, wherein detecting mismatched bits in the received power control commands comprises detecting soft bit errors.

7. The method of claim 6, wherein mapping the reception error probability to a corresponding command error rate value according to a defined probability-to-command-error-rate mapping function comprises estimating a relative soft bit error and mapping the relative soft bit error to a command error rate.

8. The method of claim 7, further comprising quantizing a distribution of the relative soft bit error using a variance measure, such that mapping the relative soft bit error to a command error rate comprises mapping a quantized relative soft bit error value to a command error rate.

9. The method of claim 1, wherein estimating a command error rate comprises mapping the estimated signal quality to a corresponding command-error-rate value according to a defined received-signal-quality-to-command-error-rate mapping function.

10. The method of claim 1, wherein generating the transmit power control feedback comprises generating feedback transmit power control commands as up or down indicator values based on determining whether the estimated signal quality is below or above the target signal quality.

11. The method of claim 1, wherein estimating a signal quality comprises estimating a signal-to-interference ratio for the power control channel, and wherein the target signal quality comprises a target signal-to-interference ratio.

12. The method of claim 1, wherein estimating a signal quality for the power control channel comprises deriving a signal quality estimate for the power control channel based on a received common pilot channel.

13. The method of claim 12, wherein deriving a signal quality estimate for the power control channel based on a received common pilot channel signal comprises calculating a gain offset between the power control and common pilot channels.

14. The method of claim 13, wherein calculating a gain offset between the power control and common pilot channels comprises calculating the gain offset based on receiver outputs.

15. The method of claim 1, wherein the power control channel comprises a Fractional Dedicated Physical Channel (F-DPCH) in a Wideband Code Division Multiple Access (W-CDMA) communication network.

16. A power control circuit for use in a wireless communication device or system, said power control circuit comprising one or more processing circuits configured to:
receive power control commands transmitted to the wireless communication device or system over a power control channel;
estimate a signal quality for the power control channel;
estimate a command error rate for the received power control commands according to a mapping function that maps estimated signal quality for the power control channel to command error rates, or maps a reception error probability calculated for power control commands received over the power control channel to command error rates;
adjust a target signal quality by comparing the estimated command error rate to a target command error rate; and
generate transmit power control feedback for the power control channel by comparing the estimated signal quality to the target signal quality.

17. The power control circuit of claim 16, wherein the one or more processing circuits comprise a signal quality estimation circuit configured to estimate the signal quality for the power control channel, a command error rate estimation circuit configured to estimate the command error rate for the received power control commands, an outer loop power control circuit configured to adjust the target signal quality, and an inner loop power control circuit configured to generate the transmit power control feedback.

18. The power control circuit of claim 16, wherein the received power control commands nominally comprise matched-bit symbols, and wherein the command error rate estimation circuit is configured to calculate the reception error probability for the received power control commands as a function of detecting mismatched bits in the received power control commands, and to estimate the command error rate by mapping the reception error probability to a corresponding command error rate value according to a defined probability-to-command-error-rate mapping function.

19. The power control circuit of claim 18, wherein the command error rate estimation circuit is configured to implement the defined probability-to-command-error-rate mapping function as a defined polynomial expression or as a data lookup table.

20. The power control circuit of claim 18, wherein the command error rate estimation circuit is configured to calculate the reception error probability by generating a difference value for each received power control command, wherein the difference value is non-zero if the received power control command includes mismatched bits, and filtering the difference values according to an exponential weighting filter to obtain the reception error probability.

21. The power control circuit of claim 18, wherein the command error rate estimation circuit is configured to detect mismatched bits in the received power control commands based on detecting hard bit errors.

22. The power control circuit of claim 18, wherein the command error rate estimation circuit is configured to detect mismatched bits in the received power control commands based on detecting soft bit errors.

23. The power control circuit of claim 22, wherein command error rate estimation circuit is configured to map the reception error probability to a corresponding command error rate value according to a defined probability-to-command-error-rate mapping function based on estimating a relative soft bit error and mapping the relative soft bit error to a command error rate.

24. The power control circuit of claim 23, wherein the command error rate estimation circuit is further configured to quantize a distribution of the relative soft bit error using a variance measure, such that mapping the relative soft bit error to a command error rate comprises mapping a quantized relative soft bit error value to a command error rate.

25. The power control circuit of claim 16, wherein the power control circuit is configured to estimate the command error rate by mapping the estimated signal quality to a corresponding command error rate value according to a defined signal-quality-to-command-error-rate mapping function.

26. The power control circuit of claim 16, wherein the power control circuit is configured to generate the transmit power control feedback as up or down indicator values based on determining whether the estimated signal quality is below or above the target signal quality.

27. The power control circuit of claim 16, wherein the power control circuit is configured to estimate the signal quality as a signal-to-interference ratio for the power control channel, and wherein the target signal quality comprises a target signal-to-interference ratio.

28. A wireless communication device comprising a power control circuit configured to generate transmit power control feedback for a power control channel received by the wireless communication device based on:
receiving power control commands over the power control channel;
estimating a signal quality for the power control channel;
generating transmit power control feedback for the power control channel by comparing the estimated signal quality to a target signal quality;
estimating a command error rate for the received power control commands according to a mapping function that maps estimated signal quality for the power control channel to command error rates, or maps a reception error probability calculated for power control commands received over the power control channel to command error rates; and
adjusting the target signal quality by comparing the estimated command error rate to a target command error rate.

29. A non-transitory computer readable medium storing a computer program for generating transmit power control feedback for a power control channel, the computer program comprising:
program instructions to estimate a signal quality for the power control channel;
program instructions to estimate a command error rate for power control commands received on the power control channel according to a mapping function that maps estimated signal quality for the power control channel to command error rates, or maps a reception error probability calculated for power control commands received over the power control channel to command error rates;
program instructions to adjust a target signal quality by comparing the estimated command error rate to a target command error rate; and
program instructions to generate transmit power control feedback for the power control channel by comparing the estimated signal quality to the target signal quality.

30. The non-transitory computer readable medium of claim 29, wherein the received power control commands nominally comprise matched-bit symbols, and wherein the program instructions to estimate a command error rate comprise program instructions to calculate the reception error probability for the received power control commands as a function of detecting mismatched bits in the received power control commands, and map the reception error probability to a corresponding command error rate value according to a defined probability-to-command-error-rate mapping function.

31. The non-transitory computer readable medium of claim 30, wherein the program instructions to calculate the reception error probability for the received power control commands comprise program instructions to generate a difference value for each received power control command, wherein the difference value is non-zero if the received power control command includes mismatched bits, and filter the difference values according to an exponential weighting filter to obtain the reception error probability.

32. The non-transitory computer readable medium of claim 29, wherein the program instructions to estimate a command error rate comprise program instructions to map the estimated signal quality to a corresponding command-error-rate value according to a defined signal-quality-to-command-error-rate mapping function.

33. The non-transitory computer readable medium of claim 29, wherein the program instructions to estimate a signal quality for the power control channel comprise program instructions to estimate a signal-to-interference ratio for the power control channel, and wherein the target signal quality comprises a target signal-to-interference ratio.

34. The non-transitory computer readable medium of claim 29, wherein the power control channel comprises a Fractional Dedicated Physical Channel (F-DPCH) in a Wideband Code Division Multiple Access (W-CDMA) communication network, and wherein the computer program comprises a computer program for generating transmit power control feedback for the F-DPCH.

* * * * *

UNITED STATES PATENT AND TRADEMARK OFFICE
CERTIFICATE OF CORRECTION

| | |
|---|---|
| PATENT NO. | : 7,916,681 B2 |
| APPLICATION NO. | : 11/296560 |
| DATED | : March 29, 2011 |
| INVENTOR(S) | : Andersson et al. |

It is certified that error appears in the above-identified patent and that said Letters Patent is hereby corrected as shown below:

In Column 6, Line 57, delete "F-PDCH" and insert -- F-DPCH --, therefor.

Signed and Sealed this
Sixth Day of September, 2011

David J. Kappos
*Director of the United States Patent and Trademark Office*